(12) United States Patent
Vyas et al.

(10) Patent No.: US 8,986,860 B2
(45) Date of Patent: Mar. 24, 2015

(54) INTEGRATED BAFFLES FOR A FUEL CELL STACK

(75) Inventors: Saurabh Vyas, Rochester, NY (US); Jeffrey A. Rock, Fairport, NY (US); Eric J. Connor, Rochester, NY (US); Daniel P. Miller, Victor, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1492 days.

(21) Appl. No.: 12/107,107

(22) Filed: Apr. 22, 2008

(65) Prior Publication Data
US 2009/0263702 A1 Oct. 22, 2009

(51) Int. Cl.
H01M 10/34 (2006.01)
H01M 8/24 (2006.01)
H01M 2/08 (2006.01)
H01M 8/02 (2006.01)
H01M 8/10 (2006.01)

(52) U.S. Cl.
CPC .... H01M 8/0276 (2013.01); H01M 2008/1095 (2013.01); Y02E 60/50 (2013.01)
USPC .............. 429/57; 429/185; 429/469; 429/508

(58) Field of Classification Search
USPC ............................. 429/57, 460, 469, 508, 185
See application file for complete search history.

(56) References Cited

U.S. PATENT DOCUMENTS

| 4,845,840 | A | 7/1989 | Elmore et al. |
| 4,913,706 | A | 4/1990 | Luoma et al. |
| 4,929,517 | A | 5/1990 | Luoma et al. |
| 5,264,299 | A | 11/1993 | Krasij et al. |
| 5,270,092 | A * | 12/1993 | Griffith et al. .................. 428/69 |
| 5,464,700 | A | 11/1995 | Steck et al. |
| 6,423,439 | B1 | 7/2002 | Barton et al. |
| 6,974,647 | B2 | 12/2005 | Wilkinson et al. |
| 7,055,830 | B2 * | 6/2006 | Udagawa ...................... 277/594 |
| 7,201,987 | B2 | 4/2007 | Sugita et al. |
| 7,210,220 | B2 | 5/2007 | Frank et al. |
| 2006/0228618 | A1 * | 10/2006 | Keegan et al. .................. 429/39 |
| 2007/0264557 | A1 * | 11/2007 | Kobayashi et al. ............. 429/36 |

FOREIGN PATENT DOCUMENTS

| CN | 1977412 A | 6/2007 |
| WO | WO 03/063280 A3 | 7/2003 |

* cited by examiner

*Primary Examiner* — Ula C. Ruddock
*Assistant Examiner* — Daniel Gatewood
(74) *Attorney, Agent, or Firm* — Fraser Clemens Martin & Miller LLC; James D. Miller

(57) ABSTRACT

A subgasket for a fuel cell is provided. The subgasket includes a barrier layer having an elongate primary seal formed thereon. The seal has at least one inwardly extending baffle adapted to militate against a reactant bypass flow in the fuel cell. A fuel cell and fuel cell stack having the subgasket are also provided.

17 Claims, 5 Drawing Sheets

US 8,986,860 B2

INTEGRATED BAFFLES FOR A FUEL CELL STACK

FIELD OF THE INVENTION

The present disclosure relates to a fuel cell and, more particularly, to a subgasket that impedes reactant bypass flow within the fuel cell.

BACKGROUND OF THE INVENTION

A fuel cell has been proposed as a clean, efficient and environmentally responsible energy source for various applications. Individual fuel cells can be stacked together in series to form a fuel cell stack. The fuel cell stack is capable of supplying a quantity of electricity sufficient to provide power to an electric vehicle. In particular, the fuel cell stack has been identified as a desirable alternative for the traditional internal-combustion engine used in modern vehicles.

One type of fuel cell stack is known as a proton exchange membrane (PEM) fuel cell stack. The typical PEM fuel cell includes three basic components: a cathode, an anode, and an electrolyte membrane. The cathode and anode typically include a catalyst such as platinum or other suitable material for facilitating the electrochemical fuel cell reaction. The electrolyte membrane is sandwiched between the cathode and the anode. Porous diffusion media, such as carbon paper and the like, are generally disposed adjacent the anode and the cathode and facilitate a delivery and distribution of reactants, such as hydrogen gas and air, thereto.

The hydrogen gas supplied to the fuel cell reacts electrochemically in the presence of the anode to produce electrons and protons. The protons pass through the electrolyte membrane to the cathode where oxygen from the air reacts electrochemically to produce oxygen anions. The oxygen anions react with the protons to form water as a reaction product. The electrons are conducted from the anode to the cathode through an electrical circuit disposed therebetween. The electrical circuit allows the fuel cell stack to be used as an electrical power source.

The electrolyte membrane, electrodes, and diffusion media are disposed between a pair of fuel cell plates and sealed, for example, with a subgasket. The subgasket typically has an elongate bead seal formed thereon that provides a substantially fluid tight seal of the fuel cell. Each fuel cell plate has an active region to which the gaseous reactants are delivered for distribution to the electrodes. The fuel cell plate also includes a feed region configured to deliver the gaseous reactants from a supply source to the active region.

In known fuel cell stacks, the diffusion media and the seal of the subgasket are spaced apart to accommodate manufacturing tolerances and to avoid overlapping the diffusion media and the seal. An overlapping of the diffusion media and the seal is known to result in an undesirable leakage of gaseous reactants. The spaced apart diffusion media and seal, however, form a gap that permits a quantity of the reactants to bypass the active area of the fuel cell plates in a phenomenon known as "reactant bypass flow". The reactant bypass flow is wasteful since the reactant is not directed to the active region of the fuel cell stack where the electrochemical fuel cell reaction takes place. The reactant bypass flow may also have an undesirable impact on durability, reliability, and performance of the fuel cell stack, particularly at low stoichiometric ratios of the reactants when a reactant starvation may occur.

There is a continuing need for a subgasket that militates against wasteful reactant bypass flow in a fuel cell stack. Desirably, the subgasket causes a higher percentage of the reactant to flow to the active regions of the fuel cell stack, and optimizes a durability, reliability, and performance of the fuel cell stack under a low stoichiometric ratio of the reactants.

SUMMARY OF THE INVENTION

In concordance with the instant disclosure, a subgasket that militates against wasteful reactant bypass flow in a fuel cell stack, causes a higher percentage of the reactant to flow to the active regions of the fuel cell stack, and optimizes durability, reliability, and performance of the fuel cell stack under a low stoichiometric ratio of the reactants, is surprisingly discovered.

In one embodiment, a subgasket for a fuel cell includes a barrier layer having an elongate primary seal formed thereon. The seal has at least one inwardly extending baffle. The baffle is adapted to militate against a reactant bypass flow in the fuel cell.

In another embodiment, a fuel cell includes a pair of fuel cell plates that define an active region and a feed region of the fuel cell. An electrolyte membrane is disposed between the pair of fuel cell plates adjacent the active region. The electrolyte membrane is sandwiched between an anode and a cathode. A pair of gas diffusion media is disposed between the electrolyte membrane and the fuel cell plates. The subgasket is disposed between the pair of fuel cell plates and adjacent the feed region of the fuel cell. The subgasket militates against a reactant bypass flow between the seal of the subgasket and the gas diffusion media.

In a further embodiment, a fuel cell stack includes a plurality of the fuel cells arranged in a stack and having the subgasket with the elongate primary seal and at least one inwardly extending baffle.

DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

Figure 1:
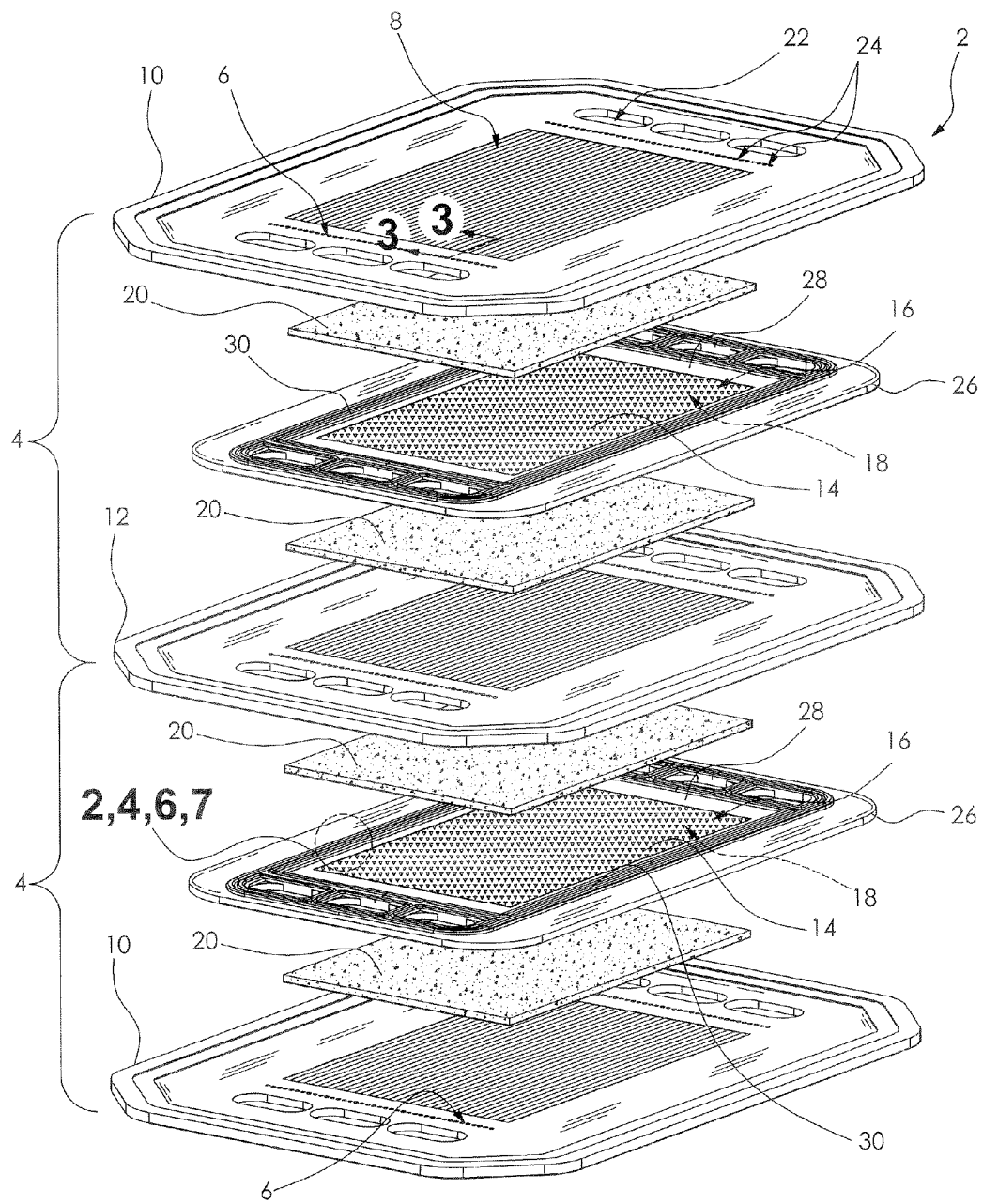
FIG. 1 illustrates a schematic, exploded perspective view of an illustrative fuel cell stack according to the present disclosure, showing only two cells.

The following description is merely exemplary in nature and is not intended to limit the present disclosure, application, or uses. It should also be understood that throughout the drawings, corresponding reference numerals indicate like or corresponding parts and features.

FIG. 1 depicts an exemplary fuel cell stack 2 according to the present disclosure. For purposes of illustration, only two fuel cells 4 are shown, it being understood that a typical fuel cell stack 2 will have many more fuel cells 4. The fuel cells 4 are typically stacked together between a pair of clamping plates (not shown) and a pair of unipolar end plates (not shown). Each of the fuel cells 4 has a feed region 6 configured to transport gaseous reactants to or from an active region 8 of the fuel cell 4. An electrochemical reaction occurs at the active region 8 of the fuel cells 4 that causes the fuel cell stack 2 to generate electrical power.

Each fuel cell 4 includes a pair of first and second fuel cell plates 10, 12. The first and second plates 10, 12 may be unipolar or bipolar plates, for example, having a plurality of flow channels and a plurality of lands formed thereon. The first and second fuel cell plates 10, 12 define the feed region 6 and the active region 8 of the fuel cell 4. For example, the flow channels are configured to deliver the gaseous reactants to the active region 8 of the fuel cell 4. The active region 8 is disposed between the first and second plates 10, 12 adjacent the flow channels when the plates 10, 12 are assembled to form the fuel cell 4. Similarly, it should be understood that the feed region 6 is disposed between the first and second plates 10, 12 and adjacent the active region 8 when the fuel cell 4 is assembled.

The fuel cell 4 includes an electrolyte membrane 14, an anode 16, and a cathode 18. The anode 16 is disposed on a first side of the electrolyte membrane 14 and the cathode 18 is disposed on a second side of the electrolyte membrane 14. The anode 16 and the cathode 18 sandwich the electrolyte membrane to form a membrane electrode assembly (MEA). The electrolyte membrane 14 is further disposed between a pair of gas diffusion media 20. The MEA may be formed as a catalyst coated membrane (CCM) or a catalyst coated diffusion media (CCDM), as desired. The electrolyte membrane 14 and gas diffusion media 20 extend substantially to an edge of the active region 8 of the fuel cell 4.

The fuel cell stack 2 includes a manifold formed by an alignment of respective manifold apertures 22 in the fuel cell plates 10, 12. The manifold is in fluid communication with a source of the gaseous reactant, such as an air compressor or a hydrogen storage tank, for example. The manifold is configured to deliver the gaseous reactant to the fuel cell stack 2 as desired. For example, the first fuel cell plate 10 has a plurality of ports 24 formed therein. At least one of the ports 24 is in fluid communication with the manifold. It should be understood that the ports 24 may include one of an inlet port configured to deliver gaseous reactants to the active region 8 of the fuel cell 4, and an outlet port configured to remove gaseous reactants from the active region 8.

The fuel cell 4 includes a subgasket 26 disposed between the first and second fuel cell plates 10, 12. The subgasket 26 may be used alone or in conjunction with a polymeric gasket (not shown) providing a substantially fluid tight seal of the fuel cell 4, as desired. The subgasket 26 is generally disposed in the feed region 6 of the fuel cell 4. The subgasket 26 includes a barrier layer 28 that militates against a mixing of the different gaseous reactants supplied to the fuel cell 4. In certain embodiments, the barrier layer 28 is formed from a substantially inert polymeric material and coupled to the electrolyte membrane 14. As a non-limiting example, the barrier layer 28 may be coupled to the electrolyte membrane 14 with an adhesive. Other suitable means for coupling the barrier layer 28 and the electrolyte membrane 14 may also be employed. In other embodiments, the barrier layer 28 is formed from the same material as the electrolyte membrane 14 and has a laminated structure. For example, a portion of the electrolyte membrane 14 may extend into the feed region 6 and be coated or laminated with a substantially inert material to militate against any undesired interaction with the first and second fuel cell plates 10, 12. The undesired interaction may include a corrosion of the first and second fuel cell plates 10, 12 and a degradation of the electrolyte membrane 14. Other suitable means for forming the barrier layer 28 may also be employed.

The subgasket 26 includes an elongate primary seal 30 formed on the barrier layer 28. For example, the primary seal 30 may be an elongate bead disposed on the barrier layer 28. In other embodiments, the primary seal 30 is integrally formed with the barrier layer 28. The primary seal 30 generally circumscribes the feed region 6 and the active region 8 of the fuel cell 4, and militates against an undesirable leakage of the gaseous reactants from the fuel cell 4. The primary seal 30 of the subgasket 26 may be disposed adjacent the manifold and further militate against an undesirable leakage of the gaseous reactant into the fuel cell 4. It should be appreciated that when the fuel cell 4 is fully assembled, a gap (shown in FIG. 3) exists between the primary seal 30 and the gas diffusion media 20. The gap is generally employed to facilitate the substantially fluid tight seal of the first and second fuel cell plates 10, 12 in forming the fuel cell 4. If unaccounted for, however, the gap acts as a bypass area that facilitates an undesirable reactant bypass flow in the fuel cell 4 around the active region 8 from the ports 24 of the first and second fuel cell plates 10, 12.

Figure 2:
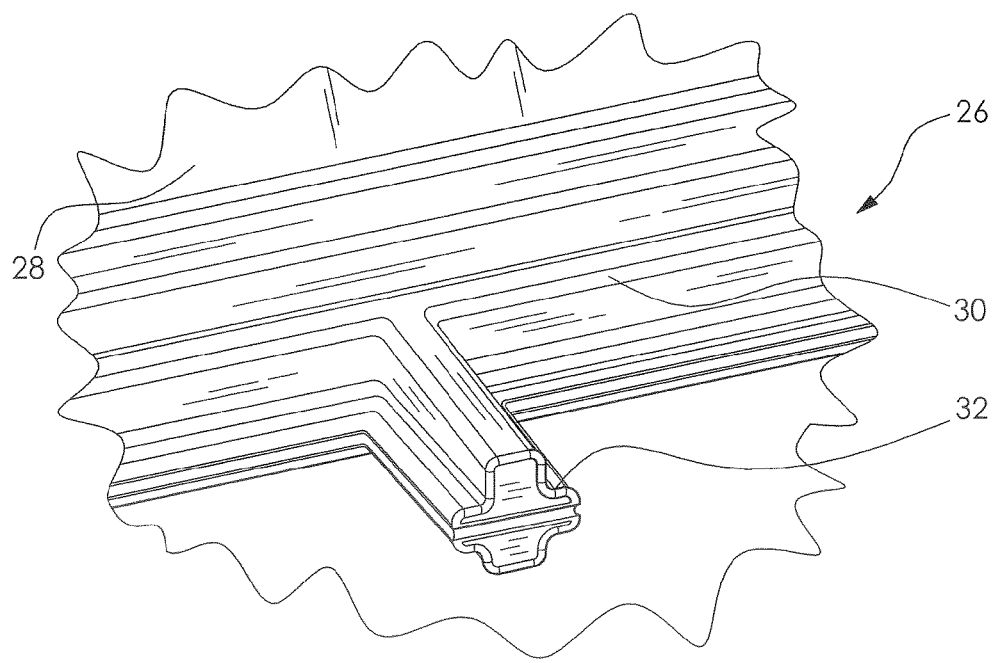
FIG. 2 is a fragmentary, perspective view of the subgasket shown in FIG. 1, showing a subgasket seal having a baffle.

As shown in FIG. 2, the subgasket 26 of the present disclosure includes at least one inwardly extending baffle 32 adapted to militate against the reactant bypass flow in the fuel cell 4. For example, the baffle 32 extends laterally inwardly from the primary seal 30 and toward the active region 8 of the fuel cell 4. A pair of baffles 32 are shown in FIG. 2 having a substantially T-shaped cross-section and disposed on a first side and a second side of the barrier layer 28. In another embodiment, the baffle 32 is a fin having a substantially rectangular cross-section. It should be appreciated that the baffle 32 may have any cross-sectional shape suitable to militate against the reactant bypass flow by minimizing the gap between the primary seal 30 and the gas diffusion media 20.

Figure 3:
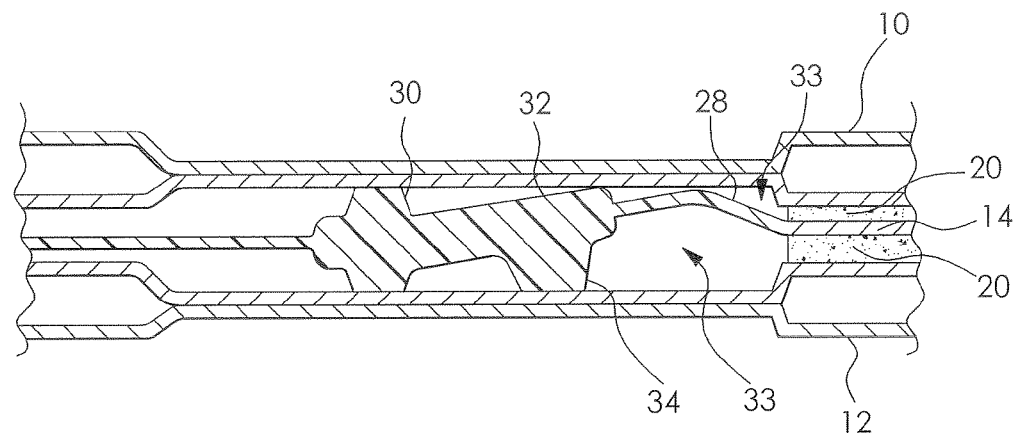
FIG. 3 is a side elevational cross-sectional view of one of the fuel cells shown in FIG. 1, showing a subgasket seal having a canted baffle according to one embodiment of the present disclosure.

In reference to FIG. 3, the baffle 32 may be canted in relation to the primary seal 30. A canting of the baffle 32 may be employed to minimize a volume of the gap 33 on either the anode-side or the cathode-side of the fuel cell 4. The baffle 32 may have a leg 34, for example, that cants the baffle 32 to a desired angle. The baffle 32 may also be canted or biased to either side of the fuel cell 4 due to an asymmetry of the primary seal 30, such as when the primary seal 30 is a double bead sealing having a first bead and a second bead, and the first bead is taller than the second bead. In one particular embodiment, the primary seal 30 is asymmetric and only has baffles 32 the cathode-side of the fuel cell 4 that are further biased to the cathode-side of the fuel cell 4 and militates against reactant bypass flow primarily on the cathode-side. A skilled artisan should understand that other suitable means for canting or biasing the baffle 32 in relation to the primary seal 30 may be employed.

The subgasket 26 may include a plurality of the baffles 32. Each of the plurality of baffles 32 is intermittently disposed in a spaced apart arrangement along the primary seal 30. It should be appreciated that the plurality of baffles 32, being disposed in a spaced apart arrangement, do not substantially increase the required compression load for the fuel cell 4, for example, as would occur were the baffle 32 to be disposed in the gap 33 substantially continuously along the primary seal 30.

The plurality of baffles 32 may be disposed on at least one of the first side of the barrier layer 28 and the second side of the barrier layer 28 as desired. In particular embodiments, a first portion of the baffles 32 may be disposed on the first side of the barrier layer 28. A second portion of the baffles 32 may be disposed on the second side of the barrier layer 28. The first and second portions of baffles 32 and are disposed in a staggered relationship to one another across the barrier layer 28. Being disposed in opposite and staggered relation, it should be understood that the barrier layer 28 on which the baffle 32 is disposed is deflected upon assembly of the fuel cell 4 which further minimizes the volume of the gap 33 opposite the baffle 32. Thus, the baffles 32 disposed in the opposite and staggered relationship may further militate against the reactant bypass flow in the fuel cell 4.

Figure 4:
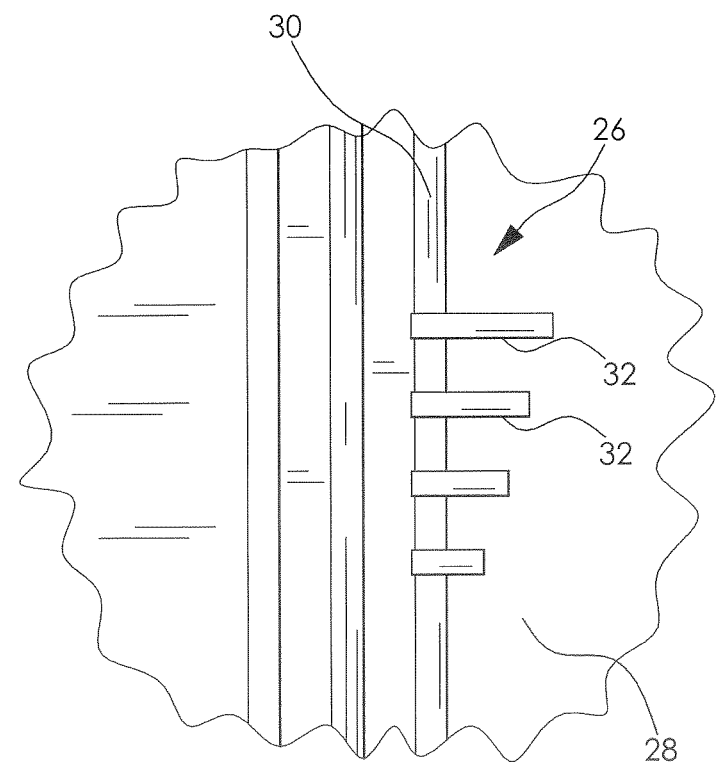
FIG. 4 is a fragmentary, top plan view of the subgasket shown in FIG. 1, showing a plurality of baffles according to another embodiment of the present disclosure.
Figure 5:
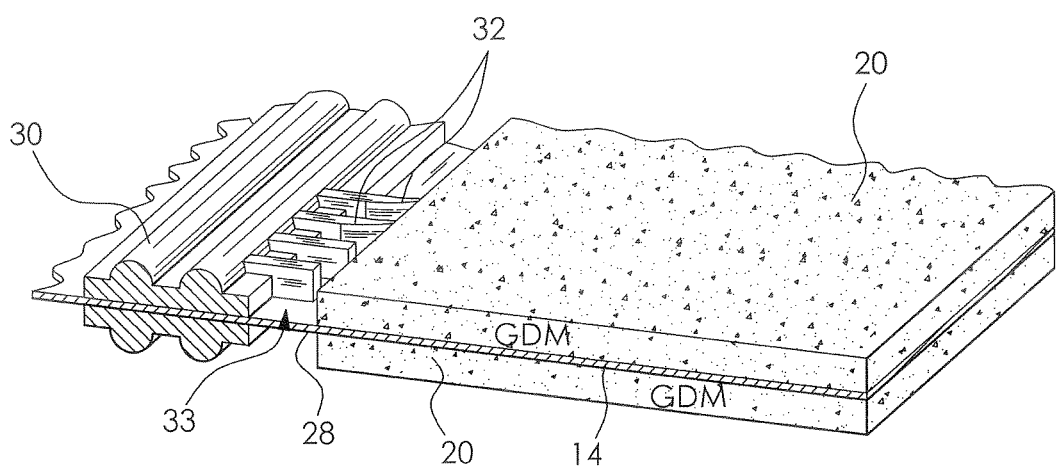
FIG. 5 is a fragmentary, perspective view of the subgasket shown in FIG. 1, further showing the subgasket assembled with the gas diffusion media and the electrolyte membrane according to an embodiment of the present disclosure.
Figure 6:
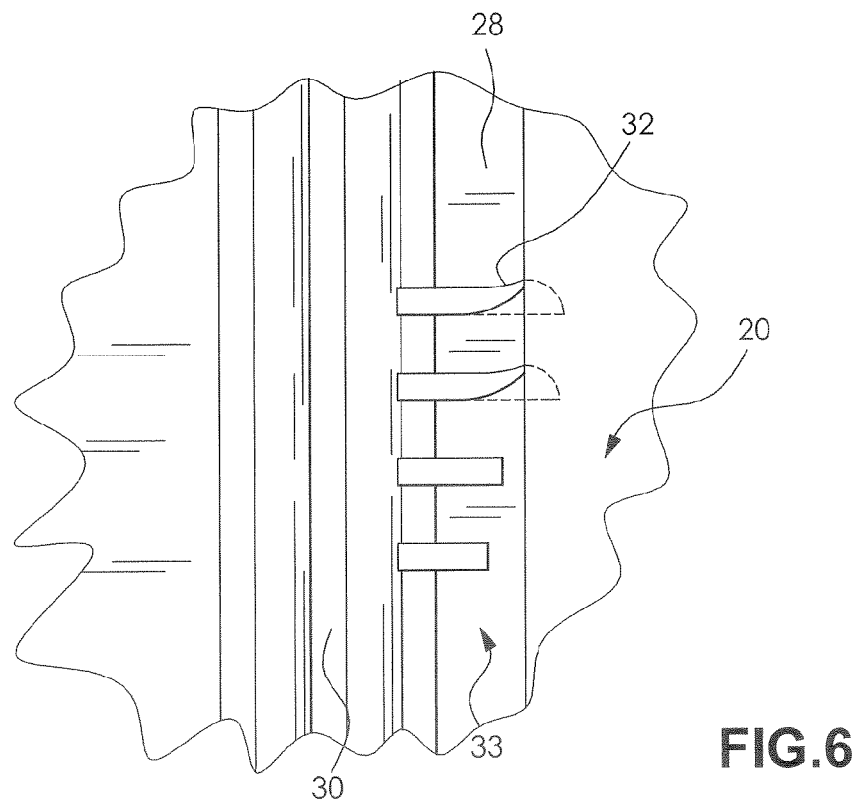
FIG. 6 is a top plan view of the subgasket shown in FIG. 5.

In one embodiment shown in FIG. 4, one of the baffles 32 extends inwardly further than another of the baffles 32. The plurality of baffles 32 may be arranged to sequentially increase in length, for example. As best shown in FIGS. 5 and 6, a portion of the baffles 32 may extend inwardly to a length sufficient for the baffles 32 to contact the gas diffusion media 20. In particular embodiments, at least one of the baffles 32 extends inwardly to abut the gas diffusion media 20 without substantially deflecting. In other embodiments, the baffles 32 that contact the gas diffusion media 20 are collapsible and may be at least one of crushed, buckled, bent, and folded against the gas diffusion media 20. The baffles 32 may have a thickness that allows the baffles 32 to be flexible and bend against the gas diffusion media 20 under conventional fuel cell 4 assembly pressures. The contact of the baffles 32 with the gas diffusion media 20 provides a barrier that militates against the reactant bypass flow.

In particular embodiments, the portion of the baffles 32 that extend inwardly toward the gas diffusion media 20 and that do not contact the gas diffusion media 20 cause the reactant bypass flow to take a tortuous path, for example, a serpentine path. The port ion of the baffles 32 that do not contact the gas diffusion media 20 also reduce a volume of the gap 33 available for the reactant bypass flow to flow through. Therefore, it should be understood that the portion of baffles 32 that does not contact the gas diffusion media 20 also militates against the reactant bypass flow.

Figure 7:
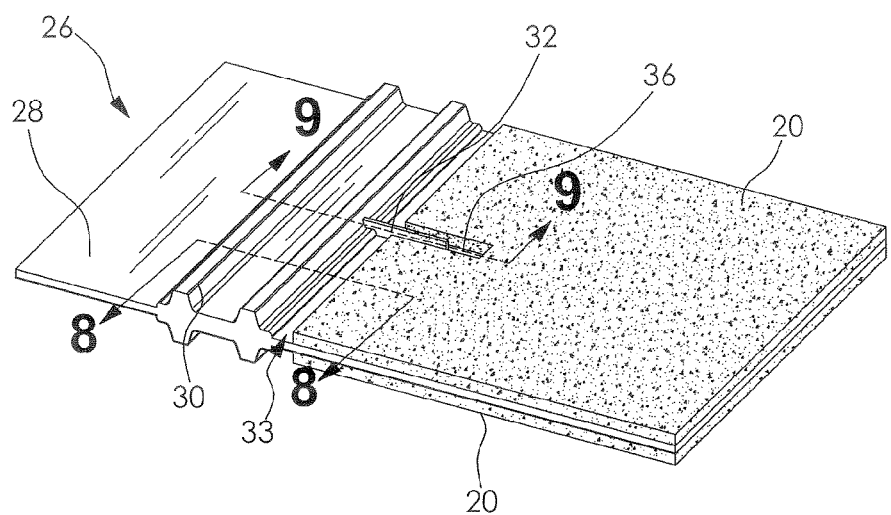
FIG. 7 is a fragmentary, perspective view of the subgasket shown in FIG. 1, further showing the subgasket assembled with the gas diffusion media and the electrolyte membrane according to another embodiment of the present disclosure.
Figure 8:
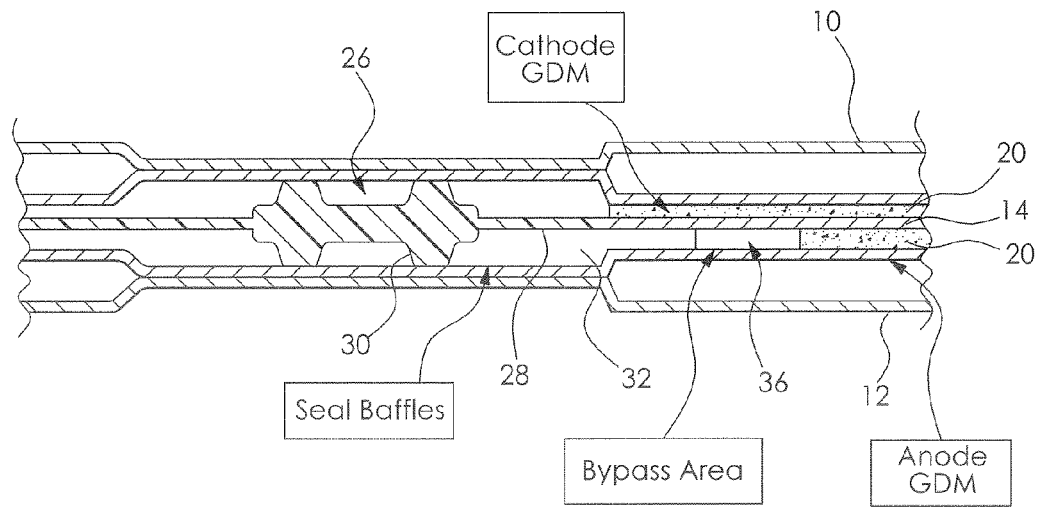
FIG. 8 is side elevational cross-sectional view of the subgasket shown in FIG. 7 further assembled with a pair of fuel cell plates, and having the baffle on an anode side of the fuel cell.
Figure 9:
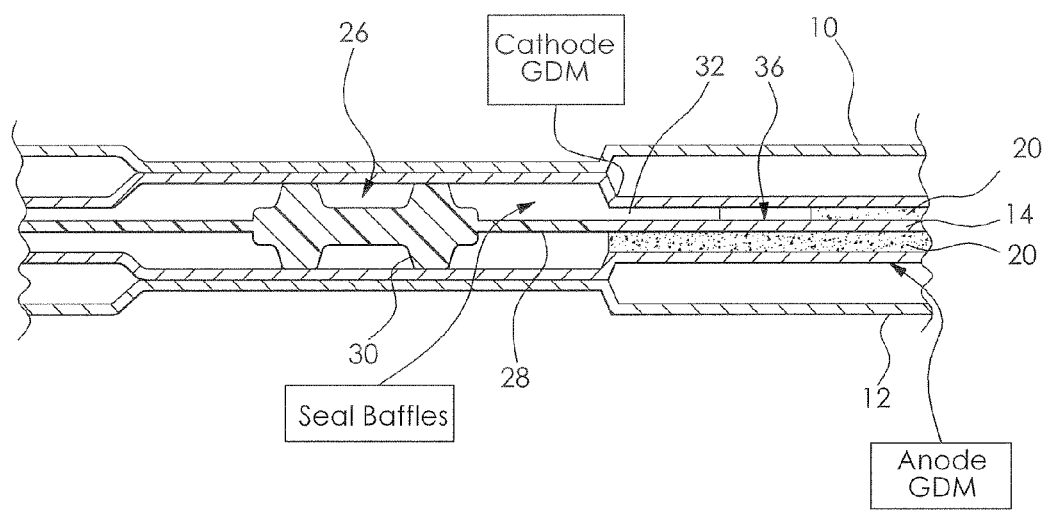
FIG. 9 is a side elevational cross-sectional view of the subgasket shown in FIG. 7 further assembled with a pair of fuel cell plates, and having the baffle on a cathode side of the fuel cell.

In a further embodiment shown in FIGS. 7 to 9, the gas diffusion media 20 of the fuel cell 4 may have a notch 36 formed therein. The notch 36 receives the baffle 32. It should be appreciated that the gas diffusion media 20 may include a plurality of notches 34 adapted to receive the plurality of baffles 32 when assembled to form the fuel cell 4. Suitable dimensions of the notch 36 may be selected as desired, for example, to substantially match a cross-section shape of the baffle 32. As shown in FIGS. 8 and 9, the baffle 32 may be disposed on at least one of the first side of the barrier layer 28, for example, the anode side, and the second side of the barrier layer 28, for example, the cathode side. It should be appreciated that the notch 36 allows the baffle 32 to militate against the reactant bypass flow while also militating against an undesirable tenting of the baffle 32 that may result if the baffle 32 were to contact an edge of the gas diffusion media 20. The notch 36 also militates against an undesirable pressure on the gas diffusion media 20 that may result from the contact of the baffle 32 therewith.

It is surprisingly found that the employment of the baffle 32 causes a higher percentage of the gaseous reactants provided to the fuel cell 4 to go to the active region 8. Wasteful and inefficient reactant bypass flow is thereby militated against. The increased availability of the gaseous reactants at the active region 8 optimizes a long-term durability, reliability and performance of the fuel cell 4. In particular, at low stoichiometric ratios where a starvation may otherwise occur, the increased availability of the gaseous reactants militates against an undesirable degradation of the fuel cell 4, such as carbon corrosion of the electrodes 16, 18. A voltage drop of the fuel cell 4 at low anode and cathode stoichiometric ratios are further militated against due to the increased availability of the gaseous reactants with the baffle 32 of the present disclosure.

While certain representative embodiments and details have been shown for purposes of illustrating the invention, it will be apparent to those skilled in the art that various changes may be made without departing from the scope of the disclosure, which is further described in the following appended claims.

What is claimed is:

1. A subgasket for a fuel cell having an active region and a feed region, comprising:
    a barrier layer:
    an elongate primary seal formed on the barrier layer, the seal circumscribing the active region and the feed region of the fuel cell and having a plurality of baffles adapted to militate against any reactant bypass flow in the fuel cell,
    wherein the baffles are integrally formed with the primary seal, and each of the baffles is an elongate finger having a secured first end connected to the primary seal and a free second end extending laterally inwardly from the primary seal toward the active region and the feed region of the fuel cell.

2. The subgasket of claim 1, wherein the primary seal is a substantially elongate bead disposed on the barrier layer.

3. The subgasket of claim 1, wherein at least one of the barrier layer and one of the baffles is canted in relation to the primary seal.

4. The subgasket of claim 3, wherein the one of the baffles has a leg adapted to cant the one of the baffles to a desired angle.

5. The subgasket of claim 1, wherein one of the baffles extends inwardly further than another of the baffles.

6. The subgasket of claim 1, wherein the baffles are disposed on one of a first side and a second side of the barrier layer.

7. The subgasket of claim 1, wherein a first portion of the baffles is disposed on a first side of the barrier layer and a second portion of the baffles is disposed on a second side of the barrier layer.

8. The subgasket of claim 7, wherein the first portion of baffles is staggered in relation to the second portion of baffles.

9. The subgasket of claim 1, wherein the primary seal is asymmetric and adapted to bias the barrier layer in a desired direction.

10. The subgasket of claim 9, wherein the asymmetric primary seal is a double bead seal with a first bead and a second bead, the first bead taller than the second bead.

11. A fuel cell, comprising:
a pair of fuel cell plates defining an active region and a feed region of the fuel cell;
an electrolyte membrane disposed between the pair of fuel cell plates adjacent the active region, the electrolyte membrane sandwiched between an anode and a cathode;
a pair of gas diffusion media disposed between the electrolyte membrane and the fuel cell plates; and
a subgasket disposed between the pair of fuel cell plates and adjacent the feed region, the subgasket including a barrier layer having an elongate primary seal formed thereon, the seal having a plurality of inwardly extending baffles adapted to militate against any reactant bypass flow between the seal and the gas diffusion media, wherein the baffles are integrally formed with the primary seal, and each of the baffles is an elongate finger having a secured first end connected to the primary seal and a free second end extending laterally inwardly from the primary seal toward the active region and the feed region of the fuel cell.

12. The fuel cell of claim 11, wherein the barrier layer is coupled with the electrolyte membrane.

13. The fuel cell of claim 11, wherein the baffles contact the gas diffusion media.

14. The fuel cell of claim 13, wherein the baffles are at least one of crushed, buckled, bent, and folded.

15. The fuel cell of claim 11, wherein the barrier layer is canted toward one of the anode side and the cathode side of the electrolyte membrane.

16. The fuel cell of claim 11, wherein the gas diffusion media includes notches formed therein that receive the baffles.

17. A fuel cell stack comprising:
a plurality of fuel cells arranged in a stack, at least one of the fuel cells further comprising
a pair of fuel cell plates defining an active region and a feed region of the fuel cell;
an electrolyte membrane disposed between the pair of fuel cell plates adjacent the active region, the electrolyte membrane sandwiched between an anode and a cathode;
a pair of gas diffusion media disposed between the electrolyte membrane and the fuel cell plates; and
a subgasket disposed between the pair of fuel cell plates and adjacent the feed region, the subgasket including a barrier layer having an elongate primary seal formed thereon, the seal having a plurality of inwardly extending baffles adapted to militate against any reactant bypass flow between the seal and the gas diffusion media, wherein the baffles are integrally formed with the primary seal, and each of the baffles is an elongate finger having a secured first end connected to the primary seal and a free second end extending laterally inwardly from the primary seal toward the active region and the feed region of the fuel cell.

* * * * *